(12) United States Patent
Prasad et al.

(10) Patent No.: US 11,675,812 B1
(45) Date of Patent: Jun. 13, 2023

(54) SYNCHRONIZATION OF METADATA BETWEEN DATABASES IN A CLOUD COMPUTING ENVIRONMENT

(71) Applicant: FMR LLC, Boston, MA (US)

(72) Inventors: Vignesh Prasad Veera Prasad, Tamil Nadu (IN); Divakar Sugumar, Chennai (IN); Raghu Kumar Thukral, Apex, NC (US); Sachin Samuel, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/956,353

(22) Filed: Sep. 29, 2022

(51) Int. Cl.
  *G06F 16/00* (2019.01)
  *G06F 16/27* (2019.01)
  *G06F 9/48* (2006.01)
  *G06F 16/25* (2019.01)

(52) U.S. Cl.
  CPC ............ *G06F 16/27* (2019.01); *G06F 9/4881* (2013.01); *G06F 16/25* (2019.01)

(58) Field of Classification Search
  CPC ......... G06F 16/27; G06F 9/4881; G06F 16/25
  See application file for complete search history.

(56) References Cited

U.S. PATENT DOCUMENTS

| | | | |
|---|---|---|---|
| 9,715,507 B2 | 7/2017 | Brand | |
| 10,783,125 B2 | 9/2020 | Bester et al. | |
| 10,824,372 B2 | 11/2020 | Zhang et al. | |
| 10,885,023 B1 | 1/2021 | Gupta et al. | |
| 10,984,017 B1* | 4/2021 | Gilderman | G06F 16/2379 |
| 11,188,507 B2 | 11/2021 | Jaiswal et al. | |
| 2003/0014432 A1 | 1/2003 | Teloh et al. | |
| 2005/0193031 A1 | 9/2005 | Midgley et al. | |
| 2007/0277010 A1 | 11/2007 | Anand et al. | |
| 2012/0084261 A1 | 4/2012 | Parab | |
| 2012/0136827 A1 | 5/2012 | Wang et al. | |
| 2019/0317866 A1 | 10/2019 | Zhou et al. | |
| 2020/0142904 A1* | 5/2020 | Chen | G06F 16/2246 |
| 2020/0233706 A1* | 7/2020 | Smith | G06F 9/5066 |

(Continued)

OTHER PUBLICATIONS

Liao et al, "Adaptive Replica Synchronization for Distributed File Systems", Sep. 2015, IEEE, vol. 9, pp. 865-877 (Year: 2015).*

(Continued)

*Primary Examiner* — Alexander Khong
(74) *Attorney, Agent, or Firm* — Cesari & McKenna, LLP (57) ABSTRACT

Methods and apparatuses are described for synchronization of metadata between databases in a cloud computing environment. A computing device identifies jobs that synchronize metadata from a first database instance to a second database instance, each job comprising synchronization tasks for a different portion of the metadata. The computing device determines a count of the synchronization tasks for each job. The computing device allocates each job to a first queue where the count of the synchronization tasks for the job is below a threshold value, and allocates the synchronization tasks for each job to a second queue where the count of the synchronization tasks for the job is at or above the threshold value. The computing device executes the jobs in the first queue and executes the synchronization tasks in the second queue to synchronize the corresponding metadata to the second database instance.

24 Claims, 6 Drawing Sheets

(56) References Cited

U.S. PATENT DOCUMENTS

2021/0096784 A1\* 4/2021 Kailey ................... G06T 1/20
2022/0083432 A1   3/2022 Mondal et al.
2022/0414112 A1\* 12/2022 Chandrasekaran ..... G06F 16/27

OTHER PUBLICATIONS

Kessler et al., "Flexible Scheduling and Thread Allocation for Synchronous Parallel Tasks", Jun. 2012, IEEE, ARCS, pp. 1-7 (Year: 2012).\*

\* cited by examiner

SYNCHRONIZATION OF METADATA BETWEEN DATABASES IN A CLOUD COMPUTING ENVIRONMENT

TECHNICAL FIELD

This application relates generally to methods and apparatuses, including computer program products, for synchronization of metadata between databases in a cloud computing environment.

BACKGROUND

Recently, many organizations have transitioned their enterprise computing infrastructures—including elements such as software applications, data warehouses, and the like—to cloud computing environments to take advantage of the adaptability, efficiency, cost savings, and redundancy offered by such environments. In typical cloud computing database environments, organizations synchronize data across all replicated instances of a given database in order to maintain secondary or backup instances of a database. However, due to the resources required to replicate corresponding metadata associated with such databases, some organizations do not elect to synchronize the metadata.

This approach can be problematic in the event that an organization has to activate one or more of the secondary database instances when the primary database instance fails or experience service disruptions. The amount of metadata that must be synchronized to the secondary instance before the instance can be activated for production use greatly affects the synchronization time. For example, when the metadata amount is large (e.g., tens or hundreds of thousands of data elements), the synchronization process can take a significant amount of time (e.g., multiple hours)—thereby impacting availability of applications that are reliant on the database and complicating the disaster recovery process. The synchronization process can be further affected in circumstances where the replicated database instance is hosted in a different region or zone of the cloud computing environment.

SUMMARY

Therefore, what is needed are methods and systems for dynamically synchronizing database metadata between database instances in a cloud computing environment to overcome the above-identified deficiencies. The techniques described herein advantageously implement a multi-threaded, asynchronous metadata replication process that spawns multiple discrete connections to the target database instance and synchronizes portions of the metadata in concurrent processing threads. As a result, the time needed for synchronization of database metadata between instances (especially during a disaster recovery event) is greatly reduced, e.g., from hours to minutes, which provides increased availability and responsiveness for enterprise-critical applications that rely on database instances.

The invention, in one aspect, features a system for synchronization of metadata between databases in a cloud computing environment. The system comprising a first database instance, a second database instance, and a computing device coupled to the first database instance and the second database instance. The computing device identifies one or more jobs that synchronize metadata from the first database instance to the second database instance, where each job comprises a plurality of synchronization tasks for a different portion of the metadata. The computing device determines, for each job, a count of the synchronization tasks for the job. The computing device allocates each job to a first queue where the count of the synchronization tasks for the job is below a threshold value. The computing device allocates the synchronization tasks for each job to a second queue where the count of the synchronization tasks for the job is at or above the threshold value. The computing device executes the jobs in the first queue to synchronize the corresponding metadata to the second database instance. The computing device executes the synchronization tasks in the second queue to synchronize the corresponding metadata to the second database instance, comprising: a) selecting a plurality of synchronization tasks from the second queue and assigning each selected synchronization task to a separate processing thread that includes a discrete connection to the second database instance, b) executing, in each processing thread, the synchronization task assigned to the processing thread to synchronize the corresponding metadata to the second database instance, and c) repeating steps a) and b) until all synchronization tasks in the second queue have been executed.

The invention, in another aspect, features a computerized method of synchronization of metadata between databases in a cloud computing environment. A computing device identifies one or more jobs that synchronize metadata from a first database instance to a second database instance, where each job comprises a plurality of synchronization tasks for a different portion of the metadata. The computing device determines, for each job, a count of the synchronization tasks for the job. The computing device allocates each job to a first queue where the count of the synchronization tasks for the job is below a threshold value. The computing device allocates the synchronization tasks for each job to a second queue where the count of the synchronization tasks for the job is at or above the threshold value. The computing device executes the jobs in the first queue to synchronize the corresponding metadata to the second database instance. The computing device executes the synchronization tasks in the second queue to synchronize the corresponding metadata to the second database instance, comprising: a) selecting a plurality of synchronization tasks from the second queue and assigning each selected synchronization task to a separate processing thread that includes a discrete connection to the second database instance, b) executing, in each processing thread, the synchronization task assigned to the processing thread to synchronize the corresponding metadata to the second database instance, and c) repeating steps a) and b) until all synchronization tasks in the second queue have been executed.

Any of the above aspects can include one or more of the following features. In some embodiments, the computing device executes the jobs in the first queue according to a defined sequence. In some embodiments, the computing device executes the synchronization tasks in the second queue asynchronously from execution of the jobs in the first queue.

In some embodiments, when a processing thread has finished executing the assigned synchronization task, the processing thread releases the connection to the second database instance and the computing device returns the processing thread to a thread pool. In some embodiments, the computing device monitors a number of active processing threads that are currently executing a synchronization task. In some embodiments, when the number of active processing threads is below a predefined value, the computing device selects another synchronization task from the second queue, activates a new processing thread from the thread pool, and assigns the selected synchronization task to the new processing thread.

In some embodiments, when at least one processing thread returns a synchronization failure indicator during execution of the corresponding synchronization task, the computing device cancels execution of all jobs and synchronization tasks. In some embodiments, the computing device generates an execution completion status for each job in the first queue during execution. In some embodiments, the computing device generates an execution completion status for each synchronization task in the second queue during execution. In some embodiments, the computing device transmits the execution completion status for each job in the first queue and the execution completion status for each synchronization task in the second queue to a remote computing device for display to a user.

In some embodiments, the first database instance and the second database instance each comprise a data warehouse hosted in a separate zone of the cloud computing environment. In some embodiments, the metadata comprises one or more of: database roles, database users, database grants, database permissions, and database privileges.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
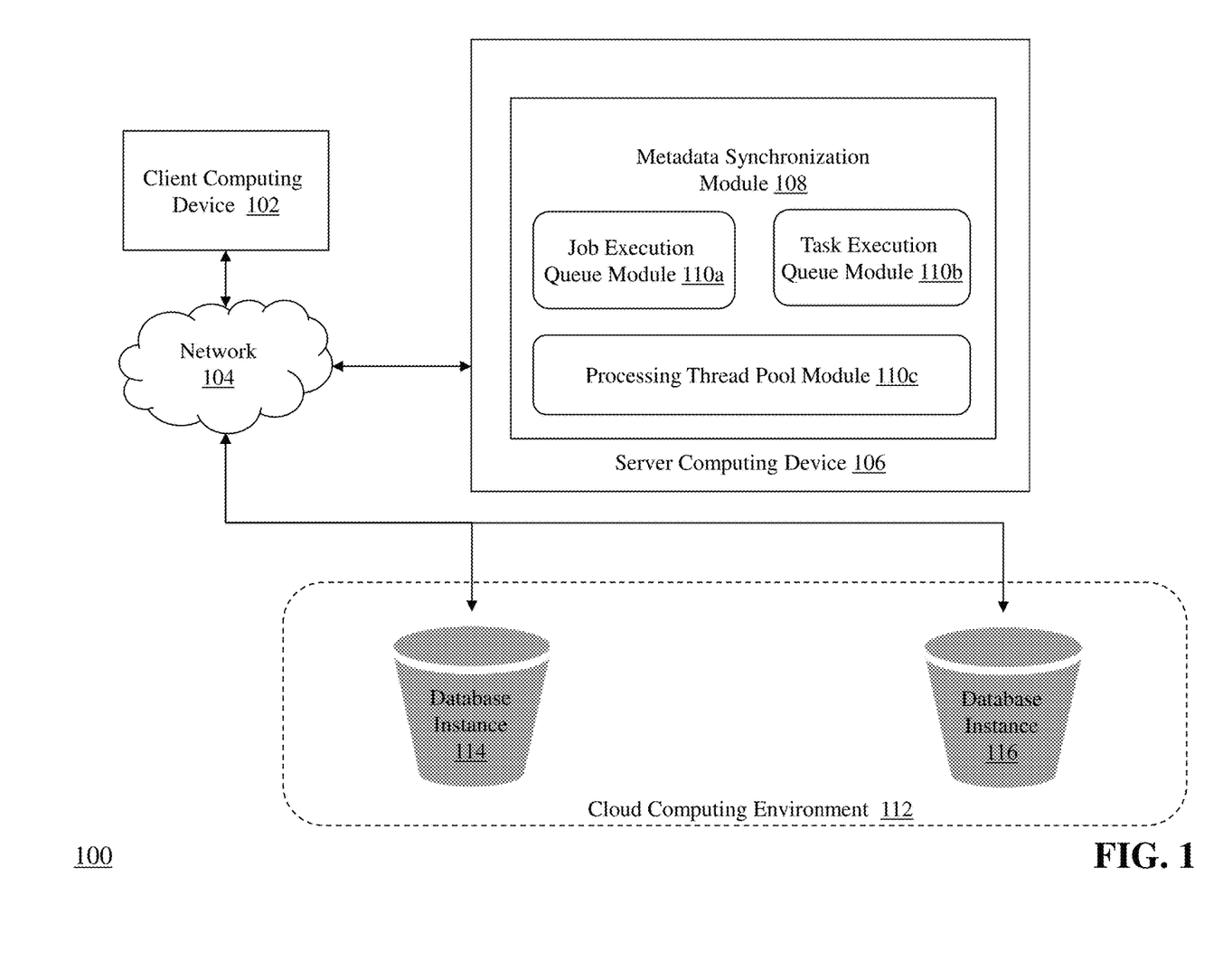
FIG. 1 is a block diagram of a system for synchronization of metadata between databases in a cloud computing environment.

FIG. 1 is a block diagram of a system for synchronization of metadata between databases in a cloud computing environment. System 100 includes client computing device 102, communications network 104, server computing device 106 that includes metadata synchronization module 108 comprising job execution queue module 110a, task execution queue module 110b and processing thread pool module 110c, and cloud computing environment 112 including database instances 114 and 116.

Client computing device 102 connects to one or more communications networks (e.g., network 104) in order to communicate with server computing device 106 to provide input and receive output relating to synchronization of metadata between databases in a cloud computing environment as described herein. Exemplary client computing devices 102 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

Communication network 104 enables client computing device 102 to communicate with server computing device 106 and enables server computing device 106 to communicate with cloud computing environment 112. Network 104 is typically a wide area network, such as the Internet and/or a cellular network. In some embodiments, network 104 is comprised of several discrete networks and/or sub-networks (e.g., cellular to Internet). In some embodiments, network 104 can be part of the same overall network topography to enable server computing device 106 to connect to client computing device 102 and/or cloud computing environment 112 using the same network.

Server computing device 106 is a device including specialized hardware and/or software modules that execute on a processor and interact with memory modules of server computing device 106, to receive data from other components of system 100, transmit data to other components of system 100, and perform functions for synchronization of metadata between databases in a cloud computing environment as described herein. As mentioned above, server computing device 106 includes metadata synchronization module 108, which comprises job execution queue module 110a, task execution queue module 110b, and processing thread pool module 110c. In some embodiments, modules 108 and 110a-110c are specialized sets of computer software instructions programmed onto one or more dedicated processors in the server computing device.

Although the modules 108 and 110a-110c are shown in FIG. 1 as executing within the same server computing device 106, in some embodiments the functionality of the modules 108 and 110a-110c can be distributed among one or a plurality of other computing devices that are coupled to the server computing device 106. It should be appreciated that any number of computing devices, arranged in a variety of architectures, resources, and configurations (e.g., cluster computing, virtual computing, cloud computing) can be used without departing from the scope of the invention. The functionality of the modules 108 and 110a-110c will be described in greater detail throughout this specification.

Cloud computing environment 112 is a cloud-based computing framework comprised of one or more computing devices coupled to network 104. Cloud computing environment 112 comprises database instance 114 and database instance 116. In some embodiments, database instances 114, 116 are data warehouses that store data associated with one or more enterprises and/or applications. Exemplary data warehouse platforms include, but are not limited to, Amazon® Redshift™ available from Amazon, Inc.; Microsoft® Azure™ available from Microsoft Corp.; Google® BigQuery™ available from Google, Inc.; and Snowflake™ Data Cloud available from Snowflake, Inc. In some embodiments, server computing device 106 can be hosted in cloud computing environment 112 or be located on a separate computing device that is external to cloud computing environment 112. In some embodiments, database instances 114, 116 are hosted in separate regions or zones of cloud computing environment 112 that utilize discrete, physically separate hardware components (e.g., computing devices, processors, memory modules) and network connections in a particular geographic area.

Each database instance 114, 116 can comprise metadata associated with the database instance and/or data within the instance. Generally, the metadata can include information relating to the contents of the database instance (e.g., data objects, structure, and relationships), information relating to backend processes or functions that operate to manage the database instance, and information relating to roles, permissions, privileges, and authentication credentials for users of the database instance.

As can be appreciated, circumstances may necessitate that a given database instance (e.g., instance 114) is replicated, transferred, and/or synchronized to another database instance (e.g., instance 116)—e.g., for disaster recovery, redundancy, data retention, or regulatory compliance requirements. As part of this process, system 100 must ensure that not only the data resident in database instance 114 is synchronized to database instance 116—but that any metadata for database instance 114 is also synchronized, so that no data discrepancies or application errors will occur in the event that database instance 116 is put into service. However, in some cases, certain portions of the metadata associated with database instance 114 may be very large (e.g., on the order of hundreds of thousands of data elements or more). In these cases, using a traditional synchronization routine that processes the metadata sequentially results in significant delays in completing the synchronization (e.g., requiring multiple hours to complete)—which can cause downtime and service interruptions to critical applications and database infrastructure.

Figure 2:
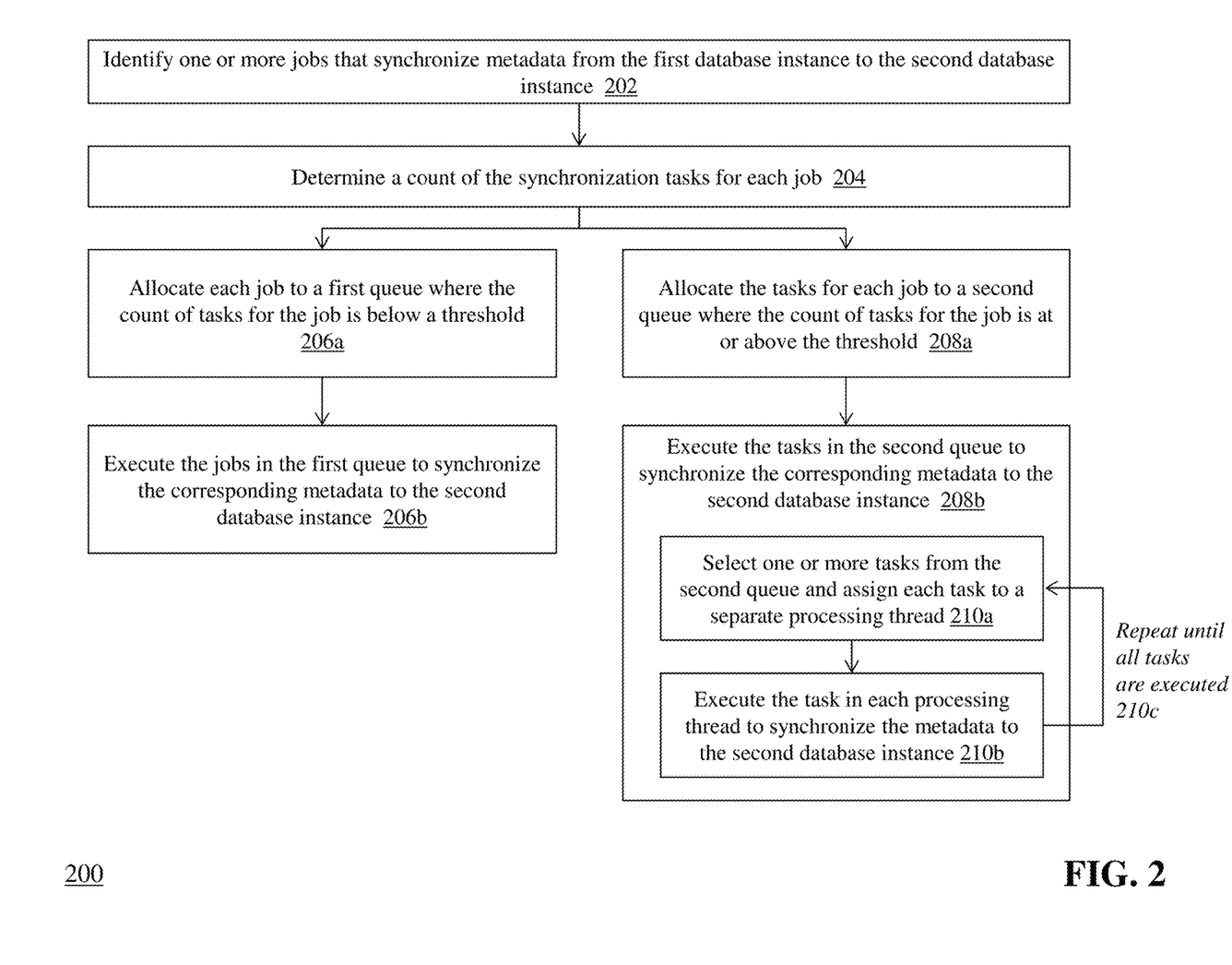
FIG. 2 is a flow diagram of a computerized method of synchronization of metadata between databases in a cloud computing environment.

To overcome these deficiencies, the methods and systems described herein provide for an improved metadata synchronization process. FIG. 2 is a flow diagram of a computerized method 200 of synchronization of metadata between databases in a cloud computing environment, using system 100 of FIG. 1. Metadata synchronization module 108 of server computing device 106 initiates a process of synchronization of metadata from a first database instance (i.e., instance 114) to a second database instance (i.e., instance 116). In some embodiments, a user at client computing device 102 can connect to server computing device 106 via network 104 and instruct metadata synchronization module 108 to being synchronizing metadata. In other embodiments, server computing device 106 and/or cloud computing environment 112 can detect conditions associated with one or more database instances that automatically trigger the synchronization process—for example, server computing device 106 can determine that a region or zone hosting database instance 114 is experiencing technical issues (such as high latency, intermittent dropped connections, and the like) that degrade the performance of database instance 114 and impact one or more applications that utilize the data stored in database instance 114. Upon detecting these conditions, server computing device 106 can initiate the synchronization process described herein to activate database instance 114, synchronize data and metadata from instance 114 to instance 116, and re-route subsequent connections to instance 116 so that uninterrupted access to the data can be provided.

Upon initializing the synchronization process, metadata synchronization module 108 identifies (step 202) one or more jobs that synchronize metadata from the first database instance 114 to the second database instance 116. In some embodiments, metadata synchronization module 108 is configured with a plurality of synchronization jobs, with each job being a set of one or more programmatic tasks that, when executed, synchronize metadata from instance 114 to instance 116. As one example, a job can relate to synchronization of a specific portion of metadata (e.g., roles, users, permissions, privileges, grants, and so forth) and each task within the job comprises a specific operation for the portion of metadata. An exemplary task could be to copy a single item of metadata from instance 114 to 116.

Once the synchronization jobs are identified, metadata synchronization module 108 determines (step 204) a count of the synchronization tasks for each job. As can be appreciated, depending upon the specific database instance, certain jobs may comprise only a small number of tasks that can be processed quickly, while other jobs may comprise a large number of tasks that require significant processing time. Module 108 evaluates each job according to the count of synchronization tasks within each job to determine a preferred way to execute the job that optimizes execution speed and efficiency as will be described below. In some embodiments, module 108 parses the job to determine the number of tasks in the job and stores the task count in a memory area. In some embodiments, module 108 determines a count of the tasks for each job by analyzing the underlying metadata in database instance 114.

Metadata synchronization module 108 allocates (step 206*a*) each job where the count of synchronization tasks for the job is below a threshold value to a first processing queue. In some embodiments, the threshold value is preconfigured and stored in module 108. In other embodiments, module 108 can calculate the threshold value based upon one or more attributes of database instance 114 and database instance 116—including the hardware and software infrastructure that hosts each instance.

For example, module 108 can determine that, out of ten jobs associated with a given database instance, seven of the jobs have task counts that fall below the threshold value. Module 108 allocates these seven jobs—including the corresponding tasks—to the job execution queue module 110*a* according to a defined sequence for execution. As can be appreciated, the job execution queue module 110*a* can comprise a processing queue that sequentially executes the synchronization tasks for each job by, e.g., retrieving the applicable metadata for the task from database instance 114 and transferring the metadata to database instance 116 for storage and configuration of the instance. In some embodiments, metadata synchronization module 108 establishes a network connection via network 104 to database instance 116 and begins sequential execution (step 206*b*) of the jobs allocated to a processing queue of job execution queue module 110*a*. During execution of each job, module 108 monitors the progress and status of the job execution (e.g., percent complete, any errors raised) and in some embodiments, transmits the progress information to client computing device 102 for display to a user. When all tasks associated with a first job in the processing queue are complete, module 108 begins execution of the next job in the sequence—continuing until all jobs are complete. At this point, module 108 can close the network connection to instance 116.

Continuing with the above example, module 108 can determine that the remaining three jobs associated with the database instance have task counts that meet or exceed the threshold value—indicating that these jobs are processing- and resource-intensive and are likely to cause a significant delay in synchronization of the metadata if processed using the sequential job queue described above. As a result, module 108 breaks up these jobs into the individual tasks and allocates (step 208a) the tasks to task execution queue module 110b for asynchronous processing as described below.

Figure 3A:
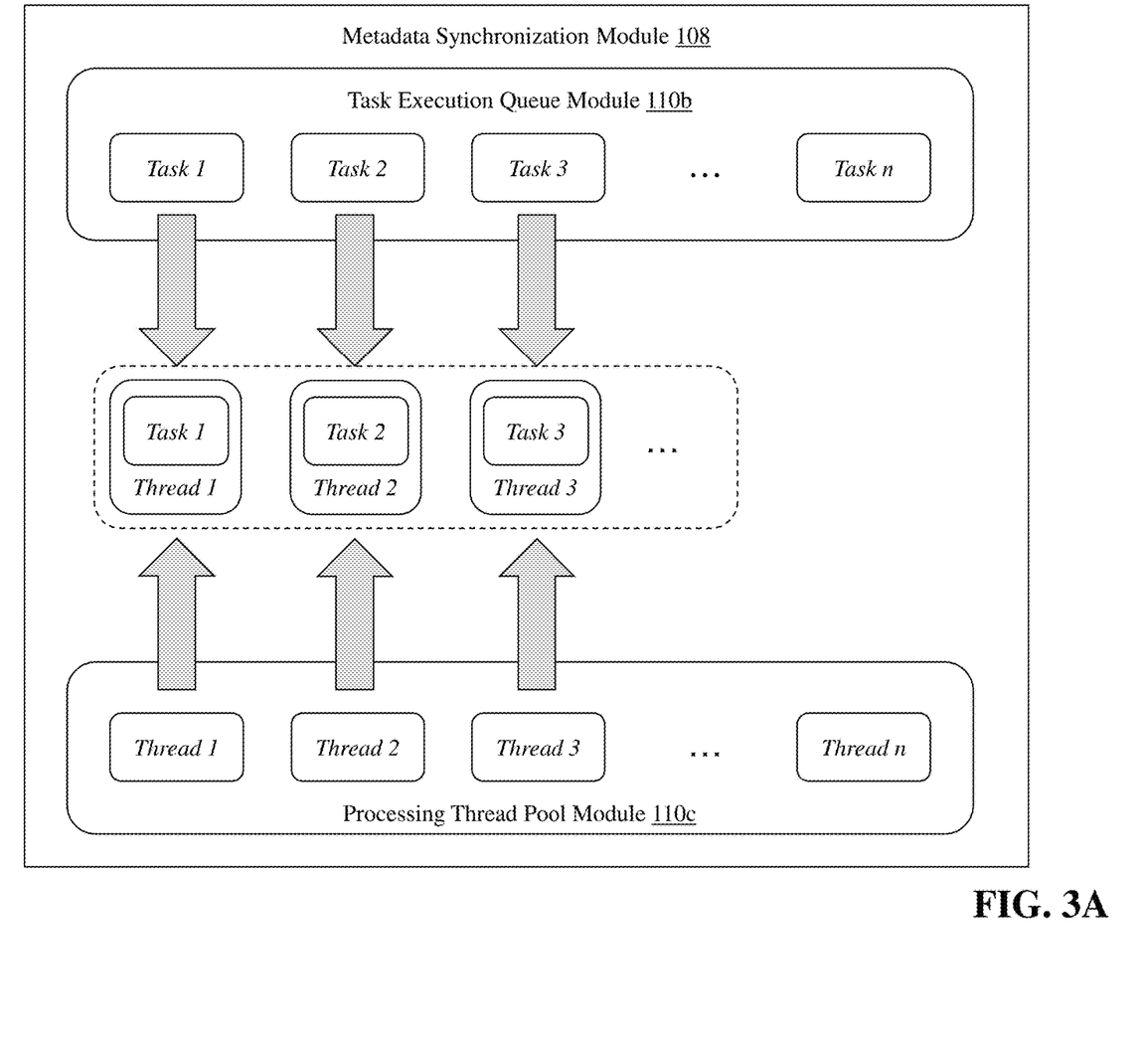
FIG. 3A and FIG. 3B are a detailed workflow diagram of asynchronous processing of metadata between databases in a cloud computing environment.
Figure 3B:
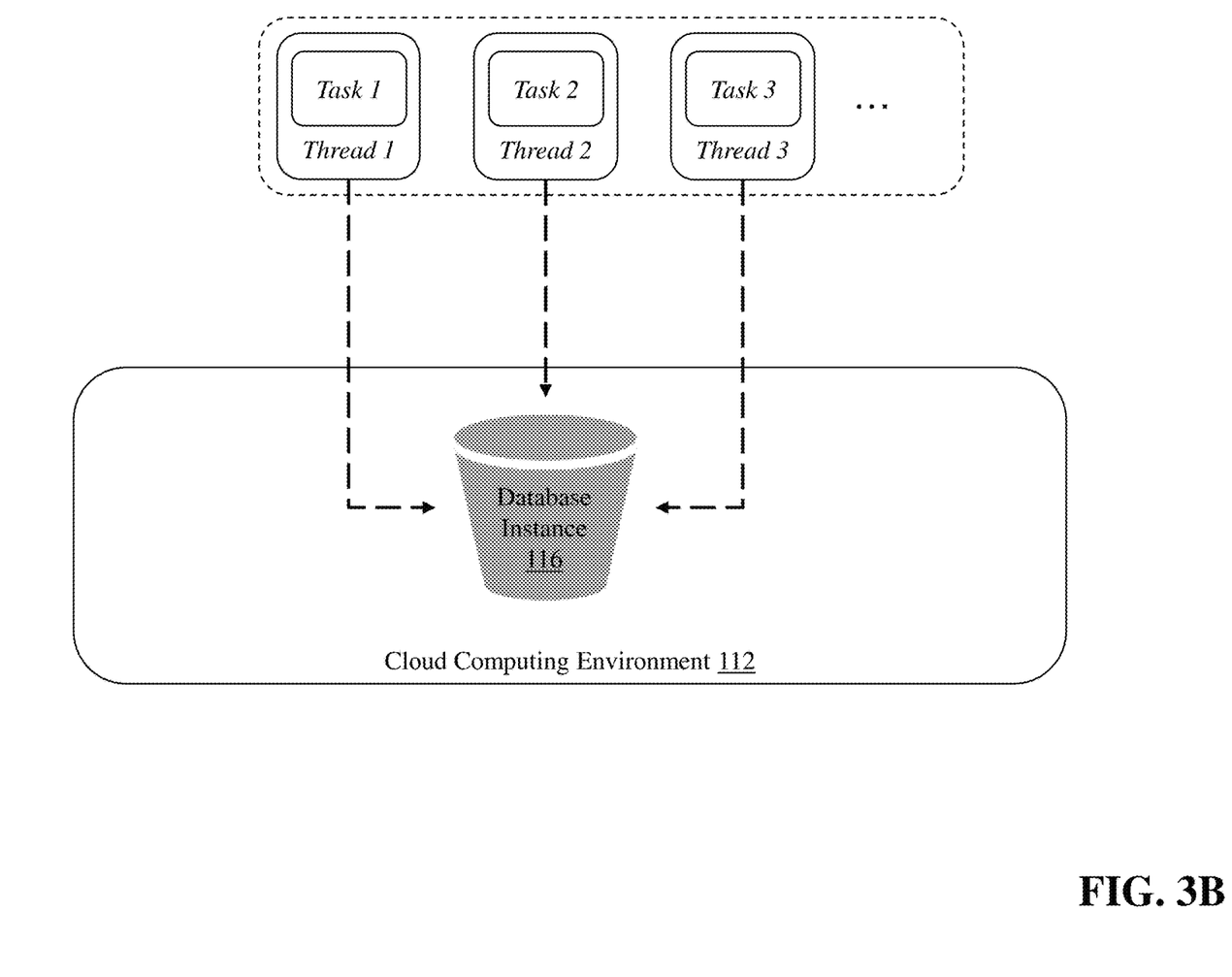

Once the tasks have been allocated to the task execution queue module 110b, metadata synchronization module 108 executes (step 208b) the tasks in a processing queue of module 110b to synchronize the corresponding metadata to database instance 116. FIGS. 3A and 3B are a detailed workflow diagram of asynchronous processing of metadata between databases in a cloud computing environment, using system 100 of FIG. 1. As shown in FIG. 3A, metadata synchronization module 108 selects (step 210a of FIG. 2) a plurality of tasks (e.g., Task 1, Task 2, Task 3) from task execution queue module 110b and assigns each task to a separate processing thread (e.g., Thread 1, Thread 2, Thread 3) requested from processing thread pool module 110c. Generally, a thread comprises a unit of instructions that is executed independently from and concurrently with other threads that share the same process resources (e.g., memory, CPU, etc.). In this way, multiple threads can be processed at the same time (called multithreading) to produce more efficient and faster execution of the instructions. As shown in FIG. 3B, each thread (Thread 1, Thread 2 Thread 3) establishes a separate network connection with database instance 116 and executes (step 210b of FIG. 2) the corresponding task that synchronizes the metadata between instance 114 and instance 116. When a thread has completed the assigned task, the thread closes the network connection to database instance 116 and metadata synchronization module 108 releases the thread back to processing thread pool module 110c for use in processing other tasks. Metadata synchronization module 108 repeats (step 210c) the selecting and executing steps 210a-210b for each task in task execution queue module 110b until synchronization is complete.

The number of synchronization tasks (n) generated for a given job and allocated to module 110b, and the number of active threads (k) instantiated from module 110c, can be optimized for the particular hardware and/or software specifications of server computing device 106 and/or cloud computing environment. For example, server computing device 106 may only be capable of executing a certain number of threads concurrently due to, e.g., memory and/or CPU capacity limitations. In another example, the number of tasks for a given synchronization job may depend upon, e.g., one or more characteristics of a particular database instance. Metadata synchronization module 108 can dynamically adjust the number of threads active at any given time and the number of tasks for a synchronization job to accommodate the processing capabilities and database requirements for the specific configuration.

For example, module 108 can determine that a particular synchronization job for database instance 114 should be granularized into n tasks (based upon, e.g., one or more aspects of the database instance). Module 108 allocates the n tasks to task execution queue module 110b. Module 108 can also determine that server computing device 106 will achieve optimal processing performance for the synchronization job by keeping k processing threads active at a time (based upon, e.g., a number of processor cores and/or memory resources in server computing device 106).

Module 108 selects k tasks from task execution queue module 110b and requests k threads from processing thread pool module 110c. Each selected task is assigned to a different thread, which executes the task using a separate connection to database instance 116. Upon execution and completion of the assigned task, the thread updates the execution completion status of the task to module 108 (e.g., 'completed') and closes the connection to instance 116. Module 108 releases the thread back to module 110c. Then, module 108 selects another task from module 110b and assigns the task to a new thread from module 110c, thereby maintaining k number of active threads. As can be appreciated, module 108 can periodically monitor the current number of active threads and if the current number falls below k, module 108 can select one or more tasks from module 110b and request the same number of new threads from module 110c. In some embodiments, the values of n and k as described herein can be identified by module 108 using, e.g., a bell-curve graph that is based upon the specific attributes of server computing device 106, cloud computing environment 112, and/or database instances 114, 116.

Figure 4A:
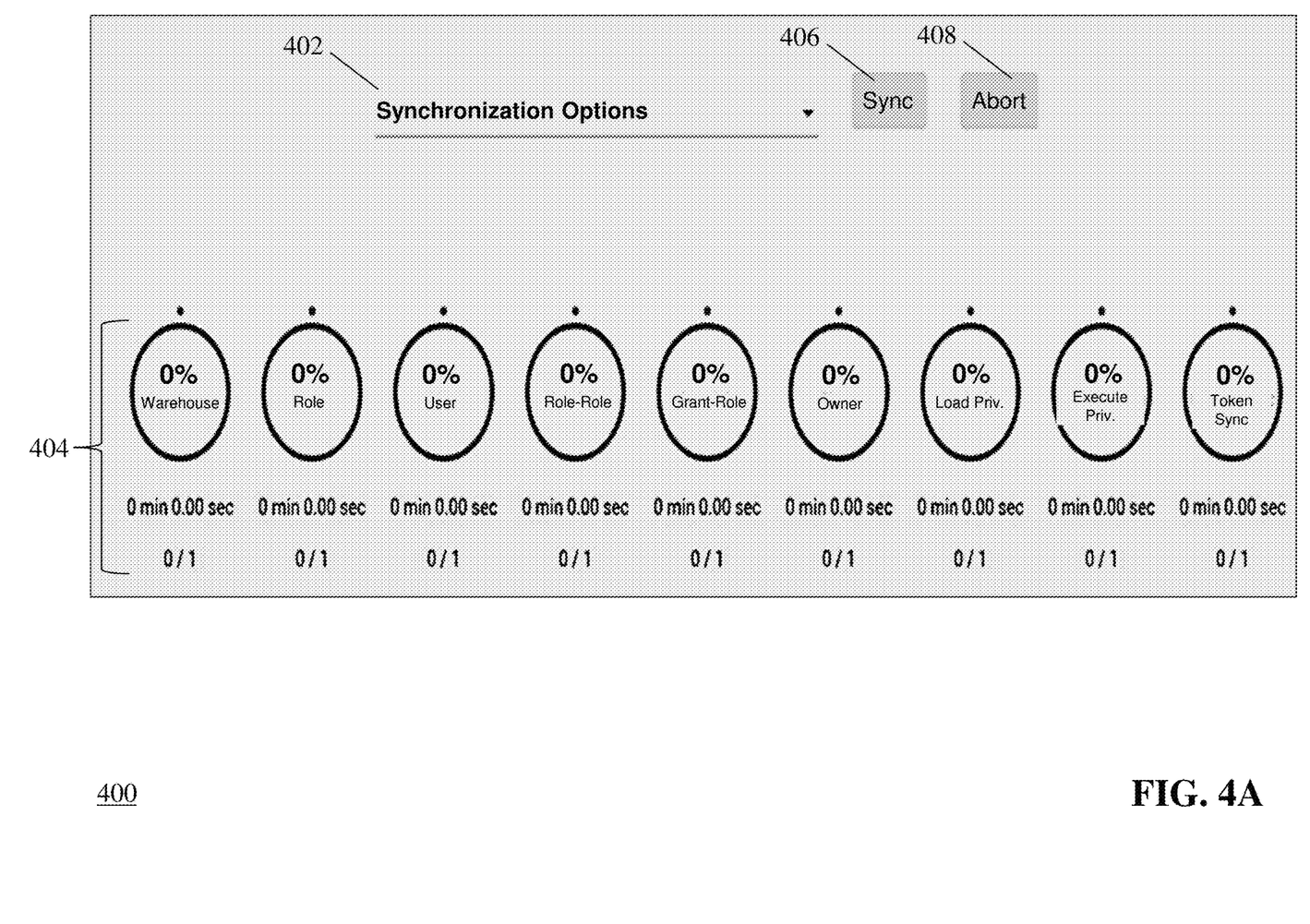
FIG. 4A and FIG. 4B are diagrams of an exemplary user interface for monitoring synchronization process of metadata between database instances.
Figure 4B:
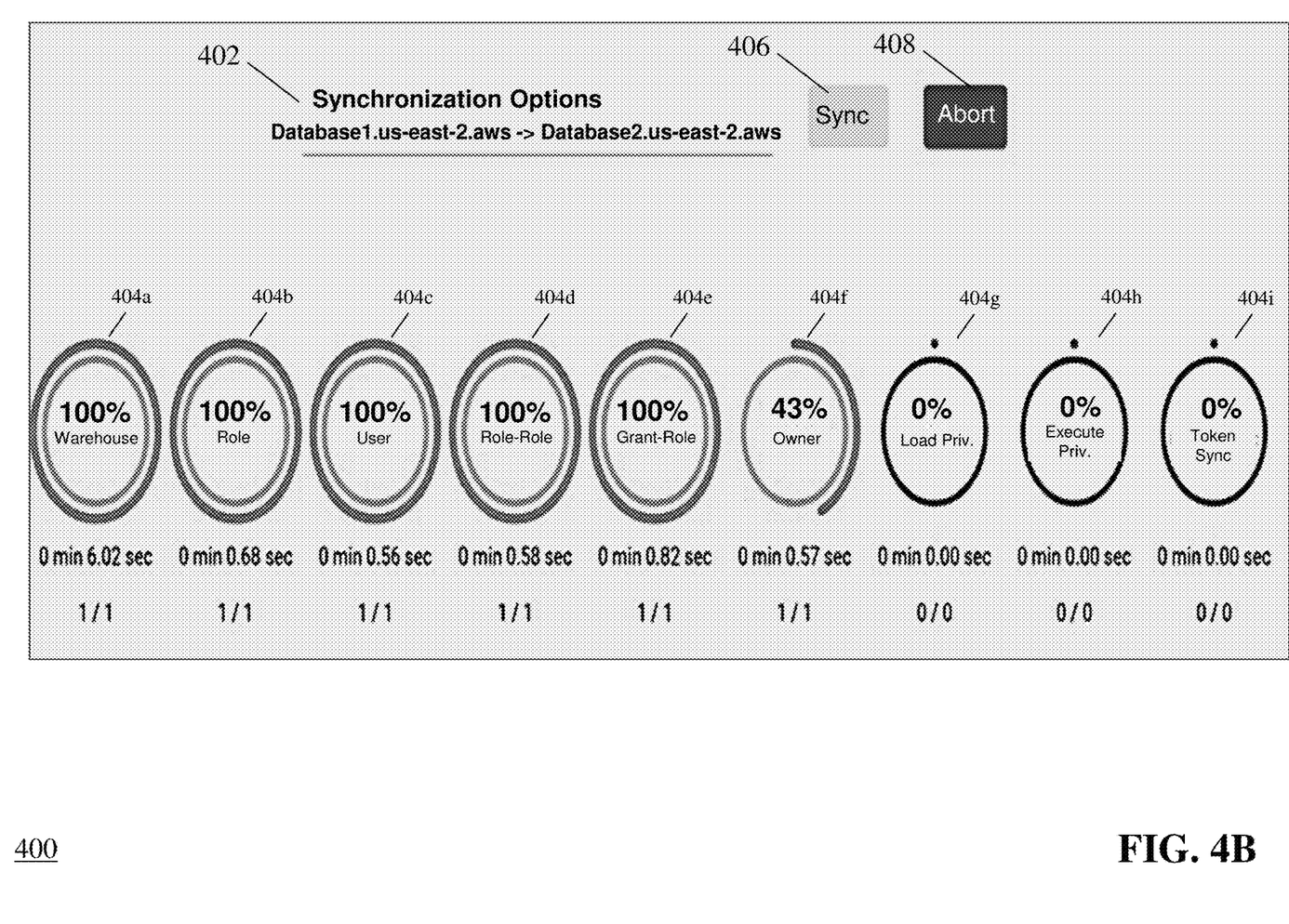

As mentioned previously, module 108 monitors the progress and status of the job execution (e.g., percent complete, any errors raised) and in some embodiments, transmits the progress information to client computing device 102 for display to a user. FIGS. 4A and 4B are diagrams of an exemplary user interface 400 for monitoring synchronization process of metadata between database instances. As shown in FIG. 4A, user interface 400 comprises a synchronization option drop-down menu 402, a plurality of synchronization status indicators 404, a sync button 406, and an abort button 408. A user at client computing device 102 can initiate a synchronization process by selecting a synchronization option from drop-down menu 402. An exemplary synchronization option can identify i) a first database instance from which metadata will be pulled and ii) a second database instance to which the metadata will be pushed. In some embodiments, the synchronization option can also identify a region or zone of cloud computing environment 112 in which the respective database instances are hosted. Once the user selects an option from menu 402, the user can select the sync button 406 to start the process.

As mentioned above, metadata synchronization module 108 then begins the synchronization process described in FIG. 2. During execution of the synchronization process, status indicators 404 are updated to indicate the status of each job. As shown in FIG. 4B, module 108 has completed five synchronization jobs (as reflected by the 100% completion metric in each indicator 404a-404e) and is currently processing the sixth synchronization job (as reflected by the 43% completion metric in indicator 404f). Three synchronization jobs have not yet started (as reflected by the 0% completion metric in indicators 404g-404i). Each indicator can include a time value that shows the execution time for the job (e.g., Warehouse job completed in 6.02 seconds). During execution, the user at client computing device 102 can select the abort button 408 to stop the synchronization process and roll back any changes to database instance 116. Also, in some instances, synchronization failure may occur during execution of one or more jobs and/or one or more tasks. In these instances, module 108 can be configured to cancel execution of all jobs and/or tasks prior to completion of the synchronization process. In addition, module 108 can generate a failure indicator for transmission to, e.g., client computing device 102 for display to a user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for synchronization of metadata between databases in a cloud computing environment, the system comprising a first database instance, a second database instance, and a computing device coupled to the first database instance and the second database instance, wherein the computing device:
   identifies one or more jobs that synchronize metadata from the first database instance to the second database instance, wherein each job comprises a plurality of synchronization tasks for a different portion of the metadata;
   determines, for each job, a count of the synchronization tasks for the job;
   allocates each job to a first queue where the count of the synchronization tasks for the job is below a threshold value;
   allocates the synchronization tasks for each job to a second queue where the count of the synchronization tasks for the job is at or above the threshold value;
   executes the jobs in the first queue to synchronize the corresponding metadata to the second database instance;
   executes the synchronization tasks in the second queue to synchronize the corresponding metadata to the second database instance, comprising:
   a) selecting a plurality of synchronization tasks from the second queue and assigning each selected synchronization task to a separate processing thread that includes a discrete connection to the second database instance,
   b) executing, in each processing thread, the synchronization task assigned to the processing thread to synchronize the corresponding metadata to the second database instance, and
   c) repeating steps a) and b) until all synchronization tasks in the second queue have been executed.

2. The system of claim 1, wherein the computing device executes the jobs in the first queue according to a defined sequence.

3. The system of claim 2, wherein the computing device executes the synchronization tasks in the second queue asynchronously from execution of the jobs in the first queue.

4. The system of claim 1, wherein when a processing thread has finished executing the assigned synchronization task, the processing thread releases the connection to the second database instance and the computing device returns the processing thread to a thread pool.

5. The system of claim 4, wherein the computing device monitors a number of active processing threads that are currently executing a synchronization task.

6. The system of claim 5, wherein when the number of active processing threads is below a predefined value, the computing device selects another synchronization task from the second queue, activates a new processing thread from the thread pool, and assigns the selected synchronization task to the new processing thread.

7. The system of claim 1, wherein when at least one processing thread returns a synchronization failure indicator during execution of the corresponding synchronization task, the computing device cancels execution of all jobs and synchronization tasks.

8. The system of claim 1, wherein the computing device generates an execution completion status for each job in the first queue during execution.

9. The system of claim 8, wherein the computing device generates an execution completion status for each synchronization task in the second queue during execution.

10. The system of claim 9, wherein the computing device transmits the execution completion status for each job in the first queue and the execution completion status for each synchronization task in the second queue to a remote computing device for display to a user.

11. The system of claim 1, wherein the first database instance and the second database instance each comprise a data warehouse hosted in a separate zone of the cloud computing environment.

12. The system of claim 11, wherein the metadata comprises one or more of: database roles, database users, database grants, database permissions, and database privileges.

13. A computerized method of synchronization of metadata between databases in a cloud computing environment, the method comprising:
   identifying, by a computing device, one or more jobs that synchronize metadata from a first database instance to a second database instance, wherein each job comprises a plurality of synchronization tasks for a different portion of the metadata;
   determining, by the computing device for each job, a count of the synchronization tasks for the job;
   allocating, by the computing device, each job to a first queue where the count of the synchronization tasks for the job is below a threshold value;
   allocating, by the computing device, the synchronization tasks for each job to a second queue where the count of the synchronization tasks for the job is at or above the threshold value;
   executing, by the computing device, the jobs in the first queue to synchronize the corresponding metadata to the second database instance;
   executing, by the computing device, the synchronization tasks in the second queue to synchronize the corresponding metadata to the second database instance, comprising:
   a) selecting a plurality of synchronization tasks from the second queue and assigning each selected synchronization task to a separate processing thread that includes a discrete connection to the second database instance,
   b) executing, in each processing thread, the synchronization task assigned to the processing thread to synchronize the corresponding metadata to the second database instance, and
   c) repeating steps a) and b) until all synchronization tasks in the second queue have been executed.

14. The method of claim 13, wherein the computing device executes the jobs in the first queue according to a defined sequence.

15. The method of claim 14, wherein the computing device executes the synchronization tasks in the second queue asynchronously from execution of the jobs in the first queue.

16. The method of claim 13, wherein when a processing thread has finished executing the assigned synchronization task, the processing thread releases the connection to the second database instance and the computing device returns the processing thread to a thread pool.

17. The method of claim 16, wherein the computing device monitors a number of active processing threads that are currently executing a synchronization task.

18. The method of claim 17, wherein when the number of active processing threads is below a predefined value, the computing device selects another synchronization task from the second queue, activates a new processing thread from the thread pool, and assigns the selected synchronization task to the new processing thread.

19. The method of claim 13, wherein when at least one processing thread returns a synchronization failure indicator during execution of the corresponding synchronization task, the computing device cancels execution of all jobs and synchronization tasks.

20. The method of claim 13, wherein the computing device generates an execution completion status for each job in the first queue during execution.

21. The method of claim 20, wherein the computing device generates an execution completion status for each synchronization task in the second queue during execution.

22. The method of claim 21, wherein the computing device transmits the execution completion status for each job in the first queue and the execution completion status for each synchronization task in the second queue to a remote computing device for display to a user.

23. The method of claim 13, wherein the first database instance and the second database instance each comprise a data warehouse hosted in a separate zone of the cloud computing environment.

24. The method of claim 23, wherein the metadata comprises one or more of: database roles, database users, database grants, database permissions, and database privileges.

* * * * *